Feb. 25, 1930.   L. R. CLAUSEN   1,748,831
COMBINATION HARVESTER THRASHER
Filed Feb. 17, 1925
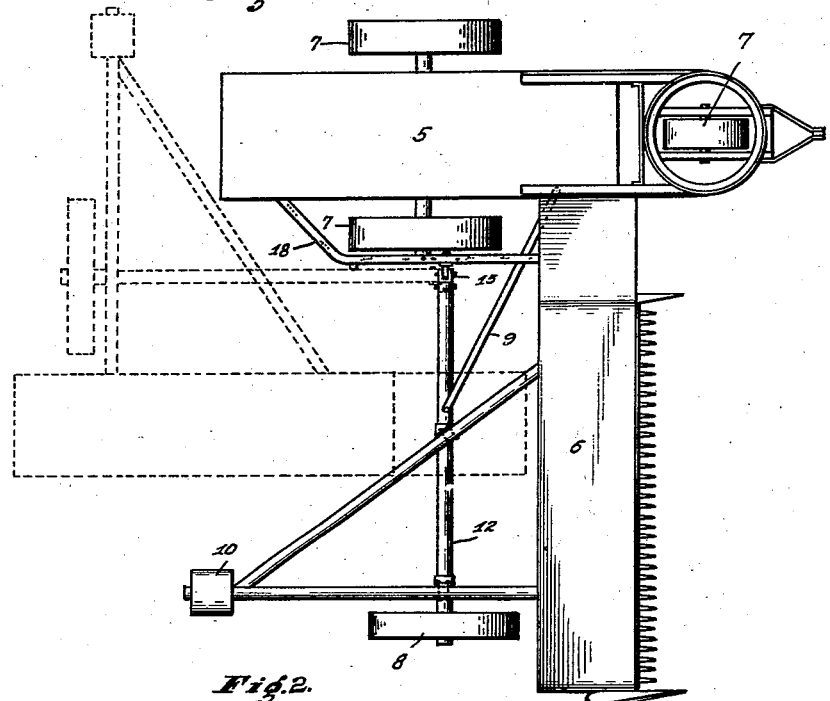
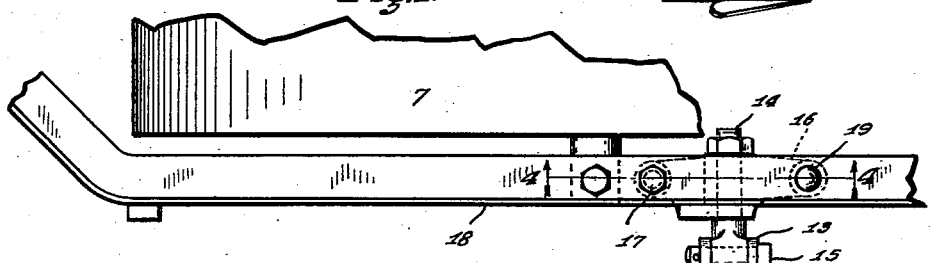
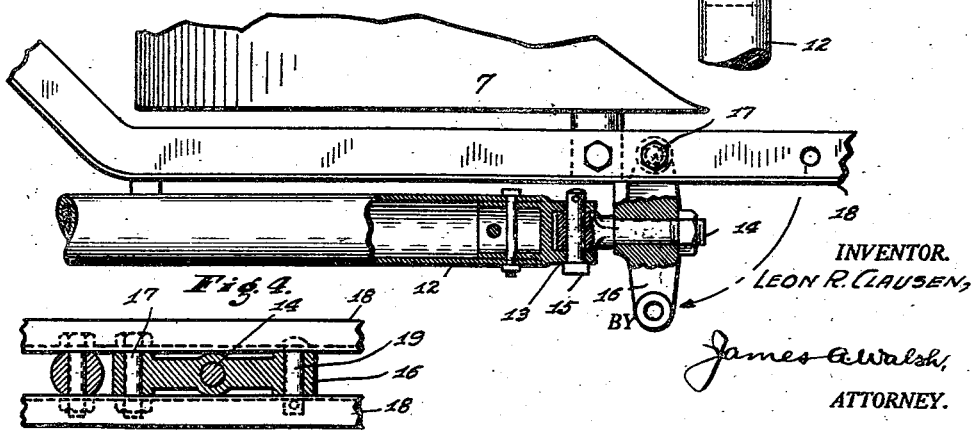
INVENTOR.
LEON R. CLAUSEN,
BY
James A. Walsh,
ATTORNEY.

Patented Feb. 25, 1930

1,748,831

UNITED STATES PATENT OFFICE

LEON R. CLAUSEN, OF RACINE, WISCONSIN, ASSIGNOR TO J. I. CASE COMPANY, OF RACINE, WISCONSIN, A CORPORATION

COMBINATION HARVESTER THRASHER

Application filed February 17, 1925. Serial No. 9,893.

In the operation of combination harvester-thrashers it is important to attach the harvester to the thrasher in a manner to permit variable movements of the harvester so that it will be of such flexibility as to readily follow ground irregularities when moving through the fields, without straining its connections with the thrasher or distorting the frame work of the machine, and by which connection the harvester may be swung horizontally alongside the thrasher, and these objects I attain by my improved coupling device, as will appear in the following description.

In the accompanying drawing, forming a part hereof, Figure 1 is a plan of a combination harvester-thrasher equipped with my improvement; Fig. 2 an enlarged plan more clearly illustrating my device; Fig. 3 a detail showing the device in the position it occupies after the harvester has been swung horizontally alongside the thrasher; and Fig. 4 a detail sectional view taken on the dotted line 4—4 in Fig. 2.

In said drawing the portions marked 5 and 6 indicate the thrasher and harvester elements of the machine, mounted upon carrying wheels, 7, 8, and provided with a brace, 9, counterbalancing weight, 10, and the usual detail constructions common to said machines.

To the inner end of the axle, 12, or other portion of the harvester as desired, I secure a hinge comprising the knuckles, 13, and rod, 14, which are connected by a pintle, 15, which hinge permits flexible vertical movements of the machine elements when moving over ground irregularities. When encountering ground depressions the harvester 6 has a tendency to tilt or dip downwardly, and, as the hinge-rod 14 is rotatably mounted in its keeper, 16, such movement of the harvester takes place under the conditions stated, said rod acting as a swivel to permit tilting or rocking motion of the harvester. As it becomes necessary to transport the machine over roads and through gates, bridges and other passageways, it is advantageous to reduce the width of the machine as a whole, which I accomplish by my improved coupling, in the following manner.

The keeper 16 is pivotally secured, at 17, to a supplemental frame, 18, of the thrasher or otherwise, the opposite end of said keeper being secured by a removable pin, 19, and when it is desired to swing the harvester alongside and parallel with the thrasher to reduce the width of the machine it is but necessary to remove brace 9 or other connections, and withdraw pin 19 from said keeper, when it is but a very simple matter to swing the harvester around to the position shown by dotted lines in Fig. 1, and as also indicated in Fig. 3, the outer end of axle 12 being supported by a chain or otherwise (not shown) to lift ground-wheel 8 slightly in order to prevent dragging or skidding of the same along the ground. It will therefore be understood that by a simple coupling of the character described the harvester is rendered capable of variable movements, that is to say, vertically when moving over ground undulations, tilting when entering depressions, and horizontally when folding alongside the thrasher.

I claim as my invention:

A coupling for a combination harvester-thrasher, comprising a hinge member adapted to be attached to a harvester, a keeper adapted to be pivotally attached to a thrasher, and a hinge-rod pivotally connected to said member and pivotally connected to said keeper.

In testimony whereof I affix my signature.

LEON R. CLAUSEN.